United States Patent Office 3,135,917
Patented June 2, 1964

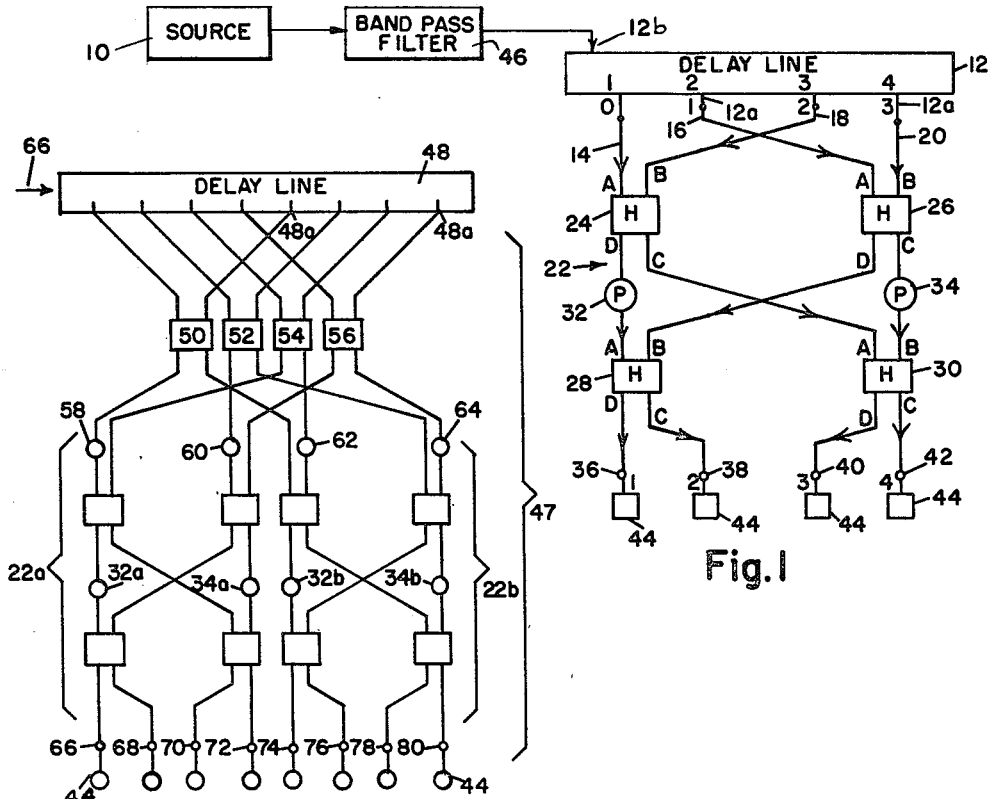
Fig. 1
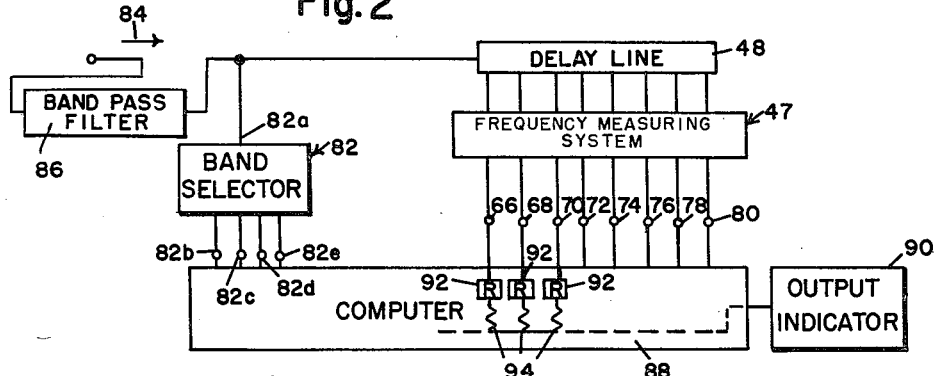
Fig. 2
Fig. 3
Ethridge C. Best
Martin R. Richmond
*INVENTORS*
*ATTORNEY*

3,135,917
FREQUENCY SENSITIVE WAVE ANALYZER INCLUDING FREQUENCY SENSING PHASE SHIFTING MEANS
Ethridge C. Best, Nashua, N.H., and Martin R. Richmond, Belmont, Mass., assignors to Sanders Associates, Inc., Nashua, N.H., a corporation of Delaware
Filed Sept. 11, 1961, Ser. No. 137,380
11 Claims. (Cl. 324—82)

This invention relates to a novel transmission line system for measuring the frequency of an electromagnetic signal. The system includes an array of phased input elements that deliver the input signal to a network comprising broad band transmission line couplers and phase shifters. The network, in turn, channels the signal to one or more output ports with relative amplitude levels at the respective ports, depending on the frequency of the signal.

In particular, the present system concerns a passive type non-adjustable type of frequency meter, that is, a system which provides a frequency indicating output without the necessity of adjusting devices such as tuned circuits, slotted lines, etc. A prior device of this type employs a series of fixed filters to channel the signal to one or more output ports, according to its frequency. A disadvantage of such system is that drift or failure of a component may result in a "hole" in the frequency coverage, so that at some frequencies there is no system output whatsoever.

Accordingly, it is a principal object of this invention to provide an improved frequency measuring system using only passive components and which is reliable in operation.

Another object of this invention is to provide an improved frequency measuring system that does not require adjustments for each measurement. More specifically, an object is to obtain substantially instantaneous measurement of frequency.

A further object is to provide a frequency measuring system having the foregoing features that is suitable for remote operation.

A further object of the invention is provide a frequency measuring system that has simple construction and a small size.

Yet another object of the invention is to provide a frequency measuring system that develops electric output signals that are suited for use with computer equipment or the like and are readily processed, where required, to an indication of the input frequency.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIGURE 1 is a schematic representation of a frequency measuring system embodying the present invention.

FIGURE 2 is a schematic representation of a network for measuring frequency with increased resolution.

FIGURE 3 is a block diagram of a system for measuring a wide range of frequencies.

In general, the present invention comprises a network of transmission line couplers and phase shifters, and is provided with a plurality of output ports. The signal whose frequency is to be measured energizes a progression of input ports with equal amplitudes and a uniform phase difference. The transmission paths through the network are unique, depending on the phase difference between the input ports, and the latter parameter varies with the frequency of the input signal. Since the path through the network thus varies with frequency, the signals delivered to respective output ports have different amplitudes depending on frequency. By observing the signal amplitudes at the output ports, the frequency is therefore identified.

More specifically, referring to FIGURE 1, the present frequency measuring system includes a source 10 that delivers radio frequency signals to a tapped delay line 12, provided with a succession of output terminals 12a. The signal is fed from the terminal 12a to input ports 14, 16, 18 and 20 of a network, indicated generally at 22, that comprises identical transmission line couplers 24, 26, 28 and 30 and phase shifters 32 and 34. The network 22 delivers the signal to one or more output ports 36, 38, 40 and 42, with the amplitude at each output port depending on the frequency of the signal developed by source 10. A meter 44 is provided at each output port to indicate the amplitude of its signal.

The network 22 is similar to apparatus described in the copending application of J. L. Butler, Serial No. 36,219, for a "Multiple Beam Antenna System," assigned to the assignee of this application. As described in that application, a signal fed into the network 22 at one output port 36, 38, 40 and 42 is passed to the input ports 14, 16, 18 and 20 with equal amplitude and a uniform phase difference between the latter ports. The phase difference varies according to the input port to which the signal is applied.

The couplers 24, 26, 28 and 30 are four-port 3 db directional couplers having fixed phase shifts between their ports. A signal fed to one of the four ports is divided into two equal output signals appearing at the opposite (FIGURE 1) ports. The output signals differ in relative phase by 90 degrees, with the output port diagonally opposite the input port having the greatest delay. For example, a signal fed in at a port $a$ is coupled equally to ports $c$ and $d$, with the signal delivered to port $c$ delayed 90 degrees in phase with respect to the signal delivered to port $d$. Preferably, the couplers are of the quarter wavelength, parallel line type.

Still referring to FIGURE 1, the alternate input ports 14 and 18 are connected to the coupler 24, and the ports 16 and 20 are connected to coupler 26. The couplers 28 and 30 each receive signals from both couplers 24 and 26 as shown in the drawing. The transmission lines between the delay line terminals 12a and the couplers 24 and 26 preferably have the same electrical length to preserve the relative phase differences between the signals at the terminals 12a. Likewise, transmission lines of equal electrical length interconnect the couplers. Thus, the only differential phase delay in the network, between its input and output ports, are provided by the couplers 24—30 and the phase shifters 32 and 34. Inherent in the above described system is the fact that if a signal is present at one of the output ports 36, 38, 40, 42, this signal will travel back through the couplers 24, 26, 28, 30, and phase shifters 32, 34, and appear as a phase shifted signal at input ports 14, 16, 18 and 20.

The delay line 12 transfers energy from an input terminal 12b to the output terminals 12a with equal amplitude at each output terminal. At a frequency $f_1$ the phase difference between the signals at adjacent terminals 12a is 45 degrees, so that the relative phase difference between alternate input ports 14 and 16, and 18 and 20, is 90 degrees, with the phase delay increasing to the right (FIGURE 1). The phase shifters 32 and 34 are characterized by a constant delay of 45 degrees for the embodiment of FIGURE 1. More specifically, the relative phases of the signals delivered to the input ports 14, 16, 18 and 20 are, respectively, 0°, 45°, 90° and 135°. Assuming an amplitude A of the signal delivered to each input port, the relative phases and amplitudes of the signals emanating from the couplers 24 and 26 are:

$$\text{Port } 24d \quad \frac{A}{2} \text{ at } 90° + \frac{A}{2} \text{ at } 270° \quad (1)$$

$$\text{Port } 24c \quad \frac{A}{2} \text{ at } 180° + \frac{A}{2} \text{ at } 180° = A \text{ at } 180° \quad (2)$$

$$\text{Port } 26d \quad \frac{A}{2} \text{ at } 135° + \frac{A}{2} \text{ at } 315° \quad (3)$$

$$\text{Port } 26c \quad \frac{A}{2} \text{ at } 225° + \frac{A}{2} \text{ at } 225° = A \text{ at } 225° \quad (4)$$

After passing through the phase shifters 32 and 34, the relative phases and amplitudes of the affected signals are:

$$\text{Port } 28a \quad \frac{A}{2} \text{ at } 135° + \frac{A}{2} \text{ at } 315° \quad (5)$$

$$\text{Port } 30b \quad A \text{ at } 270° \quad (6)$$

The relative phases and amplitudes of the signals delivered to the output ports from the couplers 28 and 30 are then:

Port 36

$$\frac{A}{4} \text{ at } 225° + \frac{A}{4} \text{ at } 405° + \frac{A}{4} \text{ at } 315° + \frac{A}{4} \text{ at } 495° = 0 \quad (7)$$

$$\text{Port } 38 \quad \frac{A}{4} \text{ at } 315° + \frac{A}{4} \text{ at } 495° + \frac{A}{4} \text{ at } 225°$$

$$+ \frac{A}{4} \text{ at } 405° = 0 \quad (8)$$

$$\text{Port } 40 \quad \frac{A}{2} \text{ at } 270° + \frac{A}{2} \text{ at } 450° = 0 \quad (9)$$

$$\text{Port } 42 \quad \frac{A}{2} \text{ at } 360° + \frac{A}{2} \text{ at } 360° = A \text{ at } 0° \quad (10)$$

Thus, an input signal having the frequency $f_1$ appears only at the output port 42. The amplitudes of the signals delivered to the remaining ports 36, 38 and 40 are zero.

When the frequency of the signal delivered to the network 22 is $3f_1$, the input signal is coupled exclusively to the output port 38, with no signal coupled to the ports 36, 40 and 42, assuming, for the moment that the couplers 24—30 and phase shifters 32 and 34 operate in the above manner over this frequency range. At frequencies intermediate $f_1$ and $3f$, input signal is coupled to both output ports 38 and 42 with no signals appearing at the output ports 36 and 40. The relative amplitudes of the signals at the ports 38 and 42 vary in a unique manner as the frequency varies, so that by measuring the relative amplitudes of the signals at these ports, the frequency of the input signal can be ascertained.

More generally, in a network having $2^m$ input ports, where $m$ is any positive integer, the input signal is coupled exclusively to one output port when its frequency is such that the phase difference between two input ports that are $2^{m-1}$ ports apart is an odd multiple of 90°. Thus, with the system illustrated in FIGURE 1, where $m=2$, the input signal is delivered to output port 42 when the phase difference between adjacent input ports is 45° (90° between ports spaced apart by $2^{m-1}$). When the frequency of the input signal increases to $3f_1$, the phase difference between the signals delivered to adjacent input ports is 135°, and the input signal is coupled exclusively to output port 38. Similarly, the input signal is delivered entirely to output port 40 when its frequency is such that the phase difference between adjacent input ports is 225°—5×90° between ports spaced apart by $2^{m-1}$ and entirely to output port 36 when the phase difference between adjacent input ports is 315°—7×90° between ports spaced apart by $2^{m-1}$. Thus, as its frequency increases, the input signal is coupled exclusively to ports 42, 38, 40 and 36, in succession.

Accordingly, the frequencies $f_1$, $f_2$, $f_3$ and $f_4$, at which an input signal is delivered exclusively to the output ports 42, 38, 40 and 36, respectively, are related by $$f_1 = \tfrac{1}{3} f_2 = \tfrac{1}{5} f_3 = \tfrac{1}{7} f_4$$

and in terms of the distance D between the successive terminals 12a, the corresponding wavelengths are given by, $$D = \tfrac{1}{8}\lambda_1 = \tfrac{3}{8}\lambda_2 = \tfrac{5}{8}\lambda_3 = \tfrac{7}{8}\lambda_4$$

Since $f_4$ is seven times $f_1$, a 7 to 1 frequency range is required to utilize the capacity of the network 22, i.e., to deliver the input signal exclusively to each output port. However, it is generally difficult and impractical to obtain couplers and phase shifters that are operable over such a wide frequency range. For example, a broadband coupler of the parallel line type is operable over approximately two octaves.

A solution to the bandwidth problem is found by noting that at a frequency $f_5 = 9f_1$, the input signal is delivered exclusively to the output port 42 and at a frequency of $f_6 = 11f_1$, the input signal is delivered exclusively to output port 38. In other words, the operation of the network 22, whereby input signals are delivered exclusively to successive ports as the input frequency by $2f_1$, is repeated at the same intervals of $2f_1$ as the frequency continues to increase.

Accordingly, to measure a practical range of frequencies, for example, between one and two megacycles, and to utilize the entire range of a practical network 22, let $f_1 = 0.1$ megacycle. Assume that the couplers 24—30 and phase shifter 32 and 34 are operable over the octave from 1–2 megacycles. When the frequency equals $11f_1$ or 1.1 mc., the input signal appears exclusively at output port 38; at the frequency $13f_1$, equal to 1.3 mc., the input signal appears exclusively at output port 40; at $15f_1$, equal to 1.5 mc., the input signal appears exclusively at output port 36; and at $17f_1$, equal to 1.7 mc., only output port 42 is energized.

Thus, by constructing the network 22 to operate at high harmonics of $f_1$, the entire range of the network 22 can be efficiently utilized, and, at the same time, the input signal is delivered exclusively to individual output ports at smaller frequency intervals. In other words, by selecting a relatively low frequency $f_1$, the practical limitations of the network 22 are met, and the resolution of the system is increased. The higher the multiple of $f_1$, the greater will be the resolution of the system. Frequencies outside the desired range of measurement may be readily excluded by inserting a band pass filter 46 (FIGURE 1) intermediate the source 10 and the input terminal 12b of the delay line. For the example given above, the pass band of the filter extends from 1 to 1.7 megacycles.

Referring to FIGURE 2, a frequency measuring system indicated generally at 47, capable of greater resolution and a wider frequency range, comprises two four-port networks 22a and 22b, similar to the network 22 of FIGURE 1, fed in parallel from a delay line 48. Identical couplers 50, 52, 54 and 56 cross-connect the input ports of each four-port network with output terminals 48a of the delay line. The couplers 50, 52, 54 and 56 are preferably identical to the couplers described with reference to FIGURE 1. Phase shifters 58, 60, 62 and 64, each characterized by a 90 degree phase shift, are connected between the couplers 50, 52, 54 and 56 and the input ports of the networks 22a and 22b as shown. The phase delay of the phase shifters 34a and 32b is 22.5°, and that of the shifters 32a and 34b is 67.5°.

The operation of the eight-port system of FIGURE 2, which is similar to that of FIGURE 1, may be considered by delivering an electromagnetic signal, indicated by the arrow 66, to the delay line 48. The signal is passed United States Patent Office 3,135,917
Patented June 2, 1964

3,135,917
FREQUENCY SENSITIVE WAVE ANALYZER INCLUDING FREQUENCY SENSING PHASE SHIFTING MEANS
Ethridge C. Best, Nashua, N.H., and Martin R. Richmond, Belmont, Mass., assignors to Sanders Associates, Inc., Nashua, N.H., a corporation of Delaware
Filed Sept. 11, 1961, Ser. No. 137,380
11 Claims. (Cl. 324—82)

This invention relates to a novel transmission line system for measuring the frequency of an electromagnetic signal. The system includes an array of phased input elements that deliver the input signal to a network comprising broad band transmission line couplers and phase shifters. The network, in turn, channels the signal to one or more output ports with relative amplitude levels at the respective ports, depending on the frequency of the signal.

In particular, the present system concerns a passive type non-adjustable type of frequency meter, that is, a system which provides a frequency indicating output without the necessity of adjusting devices such as tuned circuits, slotted lines, etc. A prior device of this type employs a series of fixed filters to channel the signal to one or more output ports, according to its frequency. A disadvantage of such system is that drift or failure of a component may result in a "hole" in the frequency coverage, so that at some frequencies there is no system output whatsoever.

Accordingly, it is a principal object of this invention to provide an improved frequency measuring system using only passive components and which is reliable in operation.

Another object of this invention is to provide an improved frequency measuring system that does not require adjustments for each measurement. More specifically, an object is to obtain substantially instantaneous measurement of frequency.

A further object is to provide a frequency measuring system having the foregoing features that is suitable for remote operation.

A further object of the invention is provide a frequency measuring system that has simple construction and a small size.

Yet another object of the invention is to provide a frequency measuring system that develops electric output signals that are suited for use with computer equipment or the like and are readily processed, where required, to an indication of the input frequency.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIGURE 1 is a schematic representation of a frequency measuring system embodying the present invention.

FIGURE 2 is a schematic representation of a network for measuring frequency with increased resolution.

FIGURE 3 is a block diagram of a system for measuring a wide range of frequencies.

In general, the present invention comprises a network of transmission line couplers and phase shifters, and is provided with a plurality of output ports. The signal whose frequency is to be measured energizes a progression of input ports with equal amplitudes and a uniform phase difference. The transmission paths through the network are unique, depending on the phase difference between the input ports, and the latter parameter varies with the frequency of the input signal. Since the path through the network thus varies with frequency, the signals delivered to respective output ports have different amplitudes depending on frequency. By observing the signal amplitudes at the output ports, the frequency is therefore identified.

More specifically, referring to FIGURE 1, the present frequency measuring system includes a source 10 that delivers radio frequency signals to a tapped delay line 12, provided with a succession of output terminals 12a. The signal is fed from the terminal 12a to input ports 14, 16, 18 and 20 of a network, indicated generally at 22, that comprises identical transmission line couplers 24, 26, 28 and 30 and phase shifters 32 and 34. The network 22 delivers the signal to one or more output ports 36, 38, 40 and 42, with the amplitude at each output port depending on the frequency of the signal developed by source 10. A meter 44 is provided at each output port to indicate the amplitude of its signal.

The network 22 is similar to apparatus described in the copending application of J. L. Butler, Serial No. 36,219, for a "Multiple Beam Antenna System," assigned to the assignee of this application. As described in that application, a signal fed into the network 22 at one output port 36, 38, 40 and 42 is passed to the input ports 14, 16, 18 and 20 with equal amplitude and a uniform phase difference between the latter ports. The phase difference varies according to the input port to which the signal is applied.

The couplers 24, 26, 28 and 30 are four-port 3 db directional couplers having fixed phase shifts between their ports. A signal fed to one of the four ports is divided into two equal output signals appearing at the opposite (FIGURE 1) ports. The output signals differ in relative phase by 90 degrees, with the output port diagonally opposite the input port having the greatest delay. For example, a signal fed in at a port $a$ is coupled equally to ports $c$ and $d$, with the signal delivered to port $c$ delayed 90 degrees in phase with respect to the signal delivered to port $d$. Preferably, the couplers are of the quarter wavelength, parallel line type.

Still referring to FIGURE 1, the alternate input ports 14 and 18 are connected to the coupler 24, and the ports 16 and 20 are connected to coupler 26. The couplers 28 and 30 each receive signals from both couplers 24 and 26 as shown in the drawing. The transmission lines between the delay line terminals 12a and the couplers 24 and 26 preferably have the same electrical length to preserve the relative phase differences between the signals at the terminals 12a. Likewise, transmission lines of equal electrical length interconnect the couplers. Thus, the only differential phase delay in the network, between its input and output ports, are provided by the couplers 24—30 and the phase shifters 32 and 34. Inherent in the above described system is the fact that if a signal is present at one of the output ports 36, 38, 40, 42, this signal will travel back through the couplers 24, 26, 28, 30, and phase shifters 32, 34, and appear as a phase shifted signal at input ports 14, 16, 18 and 20.

The delay line 12 transfers energy from an input terminal 12b to the output terminals 12a with equal amplitude at each output terminal. At a frequency $f_1$ the phase difference between the signals at adjacent terminals 12a is 45 degrees, so that the relative phase difference between alternate input ports 14 and 16, and 18 and 20, is 90 degrees, with the phase delay increasing to the right (FIGURE 1). The phase shifters 32 and 34 are characterized by a constant delay of 45 degrees for the emequally to the delay line output terminals 48a with a uniform phase difference between successive terminals, and, as explained with reference to FIGURE 1, this phase difference depends on the frequency of the input signal 66.

Again, the input signal is delivered exclusively to one output port when the phase difference between input ports, a distance of $2^{m-1}$ ports from each other, is 90°. As before, these ports are connected to the same couplers. For the eight-port system, $m=3$ ($2^3=8$) and $2^{m-1}=4$. The following table gives the phase differences between adjacent terminals 48a for which the input signal is transferred exclusively to an output port, as indicated.

| Frequency | Output Port | Phase Difference Between Adjacent Terminals 48a |
|---|---|---|
| $f_1$ | 80 | $22\frac{1}{2}°=\frac{1}{16}\lambda_1$ |
| $f_2$ | 72 | $67\frac{1}{2}°=\frac{3}{16}\lambda_2$ |
| $f_3$ | 76 | $112\frac{1}{2}°=\frac{5}{16}\lambda_3$ |
| $f_4$ | 68 | $157\frac{1}{2}°=\frac{7}{16}\lambda_4$ |
| $f_5$ | 78 | $202\frac{1}{2}°=\frac{9}{16}\lambda_5$ |
| $f_6$ | 70 | $247\frac{1}{2}°=\frac{11}{16}\lambda_6$ |
| $f_7$ | 74 | $312\frac{1}{2}°=\frac{13}{16}\lambda_7$ |
| $f_8$ | 66 | $337\frac{1}{2}°=\frac{15}{16}\lambda_8$ |

The relationship between the wavelengths $\lambda$ and the corresponding frequencies, at which the input signal is passed exclusively to one output port, can be determined by equating the electrical path length D between adjacent delay line output terminals 48a, with the phase differences in Table I, as expressed in terms of wavelength. Thus, $$D=\tfrac{1}{16}\lambda_1=\tfrac{3}{16}\lambda_2=\tfrac{5}{16}\lambda_3=\tfrac{7}{16}\lambda_4$$
$$=\tfrac{9}{16}\lambda_5=\tfrac{11}{16}\lambda_6=\tfrac{13}{16}\lambda_7=\tfrac{15}{16}\lambda_8$$

and $$f_1=\tfrac{1}{3}f_2=\tfrac{1}{5}f_3=\tfrac{1}{7}f_4=\tfrac{1}{9}f_5=\tfrac{1}{11}f_6=\tfrac{1}{13}f_7=\tfrac{1}{15}f_8$$

The operation of the eight-port system may be illustrated by using the same frequency interval, 0.2 mc., used in the illustration of the four-port system of FIGURE 1. When $f_1=0.1$ mc., the 11th through 25th multiples of $f_1$ cover the range from 1.1 to 2.5 mc., with a single output port being excited at each odd multiple of $f_1$.

Thus, the system of FIGURE 2 covers a wider frequency range than the system of FIGURE 1, with the same interval between frequencies at which the input signal appears exclusively at one output port. Alternatively, the system of FIGURE 2 can cover the same frequency range as the system of FIGURE 1, but with twice the resolution. For example, left $f_1=0.05$ mc. The multiples $21f_1$ through $35f_1$ then cover the range of 1.05 mc. to 1.75 mc. with 0.1 mc. intervals.

A frequency measuring system having the high resolution of the system of FIGURE 2 and operable over a wide frequency range is shown in FIGURE 3. It comprises the eight-port network 47 and a band selector 82. A signal whose frequency is to be measured, represented by the arrow 84, is delivered through a band-pass filter 86 to the tapped delay line 48 feeding the network 47 and also to the input terminal 82a of a band selector 82.

As described above, as the input frequency increases through the band from $f_x$ to $f_{x+7}$, the network 47 couples its input signal, at uniform frequency intervals, to one output port (66—80) after the other. As the frequency continues increasing through a second band from $f_{x+8}$ to $f_{x+15}$, the output ports are again energized, one by one, in the same succession. To remove any ambiguity as to which frequency band is exciting the network 47, the band selector 82 is arranged to provide signals at its output terminals 82b—82e according to the frequency band. Thus, the selector may comprise band pass filters, one for each band, connected to the respective terminals 82b—82e. A preferable construction for the selector 82 is similar to that of the network 22 of FIGURE 1.

Still referring to FIGURE 3, a computer 88, which may be of relatively simple and reliable construction, may be used to digest the output signals of the network 47 and selector 82 and convert them to a signal registered by an indicator 90. For example, the computer may include rectifiers 92 connected to rectify the signals appearing at the output terminals 66—80 and 82b—82e. The rectifier output voltages are summed by a summing network comprising resistors 94, and the relative resistances of the resistors are such as to properly weight the signals from the various output terminals in accordance with the frequencies found thereat.

More specifically, in accordance with the above table, the output at the terminal 80 might be given a relative weight of one unit at the indicator 90, which takes the form of a voltmeter. The output at the terminal 72 might be given two units, that at the terminal 76, three units, and so on. In that case, a computer output of one unit (in addition to the output voltage contributed by the selector 82) would correspond to a frequency providing an exclusive output at the terminal 80; an output of two units would indicate the frequency of the terminal 72. An output of 1.5 units would then indicate a frequency half-way between these two frequencies.

In summary, in the present frequency measuring system, the signal whose frequency is to be measured energizes a succession of input ports so that the phase difference between adjacent ports is a function of the frequency. A network of broadband transmission line couplers and phase shifters transfers the signals at the input ports to one or more output ports, as described above, with the amplitude of the signal at each output port depending on the phase difference between adjacent input ports. The amplitudes of the signals at the output ports are measured to provide an instantaneous determination of the frequency. Since no tuning or other adjustments are required and the system requires only passive elements, it is particularly suited for continuously monitoring of frequency and for use in remote locations.

The system is flexible and can be readily expanded to measure frequencies over a wider range and with increased resolution. More particularly, while four- and eight-port networks have been described above, it will be apparent that the basic networks can be combined to double, quadruple, etc., the number of ports to provide even greater resolution. The resolution also depends on the distances between the taps on the input delay lines (12 and 48 in FIGURES 1 and 2). From the above description it will be apparent that the resolution increases with this distance.

The electric output signals from the frequency measuring system are suited for use with computer equipment or to provide the "error signal" for a servocontrol system. Furthermore, the system can be constructed of strip transmission line, fabricated with photoetching techniques, to have minimum size and light weight. Another advantage of the system lies in the fact that the failure of a component may cause an error, but there will still be a system output.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

What is claimed is:

1. Frequency-measuring apparatus comprising, in combination, a transmission line network having a succession of input ports and a plurality of output ports, said network providing a plurality of transmission line paths of different electrical lengths between each input port and